May 19, 1936.  W. STELZER  2,041,441
WHEEL
Filed April 8, 1931

INVENTOR.
WILLIAM STELZER
BY
ATTORNEY.

Patented May 19, 1936

2,041,441

UNITED STATES PATENT OFFICE 2,041,441

WHEEL

William Stelzer, South Bend, Ind., assignor to Bendix Brake Company, South Bend, Ind., a corporation of Illinois Application April 8, 1931, Serial No. 528,465

1 Claim. (Cl. 301—6)

This invention relates to wheels in general, and more particularly to a wheel of the compression type well adapted for automotive vehicles.

The invention contemplates the provision of a rigid wheel structure of few parts and fully capable of withstanding both load and side thrust stresses.

A further object is to provide a method of making such a wheel involving a minimum of steps.

A further object of the invention is to provide a particular combination of spoke and disk structure constituting the body of the wheel, a portion of such structure fulfilling the double function of a brake drum and wheel body part.

Other objects of the invention including details of the means for securing the parts of the wheel structure together and other details of structure will become apparent from the following detailed description of a preferred embodiment of the invention, which embodiment is fully disclosed in the accompanying drawing in which.

Figure 1:
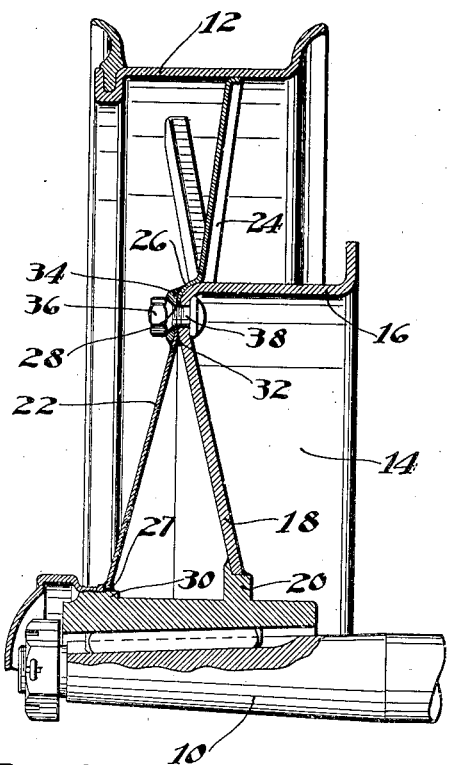
Figure 1 is a partial vertical sectional view through the wheel structure of my invention taken on line 1—1 of Figure 2.
Figure 2:
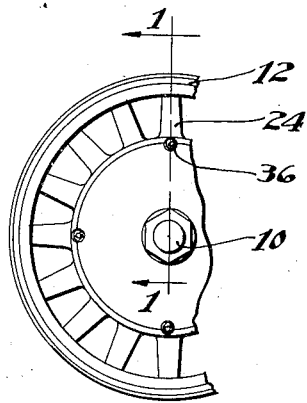
Figure 2 is a fragmentary side elevation of the wheel.

In one embodiment selected for illustration, there is disclosed in Figures 1 and 2 a conventional hub structure 10 and rim structure 12 adapted to be secured together by my novel wheel structure. This structure comprises a brake drum member 14, the angle included between the braking flange 16 and head 18 of the drum being less than a right angle, the head preferably being integrally secured as by welding to a flange portion 20 on the hub structure.

A disk body member 22, constituting an important feature of my invention, is preferably formed from suitable stock material, spoke portions 24 being formed in its outer periphery. Each spoke member is preferably shaped to provide a channeled section, and at its base merges with an imperforate section 26, the material of which is preferably pressed out to nest with and be supported upon the juncture of the head and brake flange structure of the drum. The outer ends of the spokes 24 are adapted to be secured to the rim 12, and the inner peripheral edge of the disk body is adapted to be integrally secured to the hub 10.

The disk body 22 is then severed at 28, Figure 1, to provide inner and outer wheel body sections. The inner disk body section is then preferably welded at 27 to a flange 30 on the hub and at its outer periphery is preferably welded at 32 to the head of the brake drum. This structure provides a very rigid triangular sectioned inner wheel body member adapted to support the somewhat yieldable outer wheel spoke section previously described. The imperforate inner portion 26 of the outer wheel member is preferably provided with a plurality of spaced lugs 34 to receive nuts 36 threaded upon studs 38, the latter being preferably integrally secured to the inner junction of the head and flange of the brake drum and extended through openings in the head and outer periphery of the inner disk body portion.

A very simple method of fabricating the wheel body is thus provided, the outer wheel body portion being rigidly supported by the brake drum and effectively mating with the inner wheel body portion by virtue of the aforementioned severing step in the method of manufacture.

The outwardly extending spoke portions 24 are preferably integrally secured to the rim as by welding and are so inclined as to readily take both normal and side thrust loads in compression as prolongations of the inner wheel body members 22 and 18.

Figure 3:
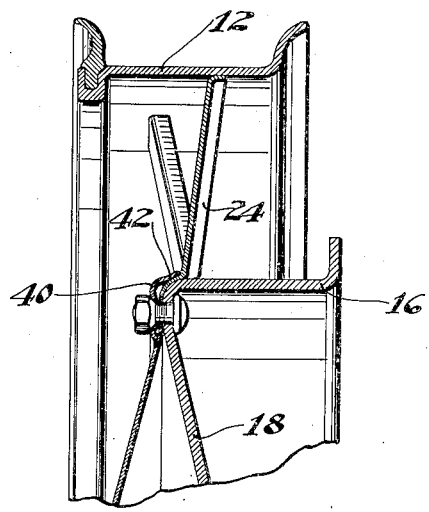
Figure 3 is a fragmentary vertical sectional view disclosing a modified form of securing means for the wheel body sections.

If desired, the lugs 34 of Figures 1 and 2 may be supplanted by an annular ring member 40 of Figure 3, which member is preferably integrally secured at 42 at its outer periphery to the imperforate portion of the outer spoked wheel body member.

While there has been illustrated and described two embodiments of my invention, it is not my intention to limit the scope of the invention to these particular embodiments or otherwise than by the terms of the appended claim.

I claim:

A wheel structure comprising a triangular sectioned body member, including a hub, a brake drum having a drum head secured at one end of said hub, and a hub disc secured to the other end of said hub and having its periphery secured to said brake drum head adjacent the periphery thereof, a demountable rim-supporting structure comprising a rim, and a rim-supporting annular disc, said disc being cupped adjacent its inner periphery to embrace said brake drum and extend inwardly over the outer portion of the drum head, the inner periphery of the annular disc being of substantially the same diameter as the outer diameter of the hub disc, and adapted to seat on an annular shoulder formed by the periphery of the hub disc, said shoulder and engaging portion of annular disc forming a bolt hold circle, an annular flange secured to one of said discs overlapping said shoulder and inner periphery, and a series of bolts arranged on the bolt circle passing through said annular flange and brake drum head.

WILLIAM STELZER.